(12) United States Patent
Gallardo

(10) Patent No.: US 9,219,323 B1
(45) Date of Patent: Dec. 22, 2015

(54) MULTIPLE CONNECTOR DIRECT CONNECTION EXTERNAL MEMORY DEVICE

(71) Applicant: Rene Gallardo, Aurora, CO (US)

(72) Inventor: Rene Gallardo, Aurora, CO (US)

( * ) Notice: Subject to any disclaimer, the term of this patent is extended or adjusted under 35 U.S.C. 154(b) by 0 days.

(21) Appl. No.: 14/196,394

(22) Filed: Mar. 4, 2014

(51) Int. Cl.
*H01R 13/44* (2006.01)
*H01R 13/447* (2006.01)
*H01R 13/639* (2006.01)

(52) U.S. Cl.
CPC ............ *H01R 13/447* (2013.01); *H01R 13/639* (2013.01)

(58) Field of Classification Search
CPC .... H01R 13/447; H01R 13/44; H01R 12/613; H04M 1/0254; H04M 1/72552; G06F 11/1469
USPC ......................................................... 439/149
See application file for complete search history.

(56) References Cited

U.S. PATENT DOCUMENTS

| | | | |
|---|---|---|---|
| 6,625,472 B1* | 9/2003 | Farazmandnia et al. | 455/557 |
| 7,349,719 B2 | 3/2008 | Buniatyan | |
| 8,282,012 B2 | 10/2012 | Chen et al. | |
| 2001/0044331 A1* | 11/2001 | Miyoshi et al. | 455/572 |
| 2004/0063464 A1* | 4/2004 | Akram et al. | 455/559 |
| 2004/0116155 A1* | 6/2004 | Aisenberg | 455/558 |
| 2004/0225796 A1 | 11/2004 | Hanson et al. | |
| 2005/0022055 A1* | 1/2005 | Ho | 714/13 |
| 2006/0211409 A1 | 9/2006 | Davis | |
| 2010/0248775 A1 | 9/2010 | Mikkelsen et al. | |

FOREIGN PATENT DOCUMENTS

WO    WO2004055635    7/2004

* cited by examiner

*Primary Examiner* — Jean F Duverne

(57) ABSTRACT

A multiple connector direct connection external memory device facilitates retrieval and storage of data from a plurality of connection types. The device includes a housing having a top face, a bottom face, and a perimeter edge coupled to and extending between the top face and the bottom face. A plurality of connectors is provided. Each connector is configured for coupling to a unique port type relative to each other connector. At least one of the connectors is a universal serial bus. A memory unit is coupled to the housing. Each connector is in communication with the memory unit.

12 Claims, 3 Drawing Sheets

MULTIPLE CONNECTOR DIRECT CONNECTION EXTERNAL MEMORY DEVICE

BACKGROUND OF THE DISCLOSURE

Field of the Disclosure

The disclosure relates to memory devices and more particularly pertains to a new memory device for facilitating retrieval and storage of data from a plurality of connection types.

SUMMARY OF THE DISCLOSURE

An embodiment of the disclosure meets the needs presented above by generally comprising a housing having a top face, a bottom face, and a perimeter edge coupled to and extending between the top face and the bottom face. A plurality of connectors is provided. Each connector is configured for coupling to a unique port type relative to each other connector. At least one of the connectors is a universal serial bus. A memory unit is coupled to the housing. Each connector is in communication with the memory unit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
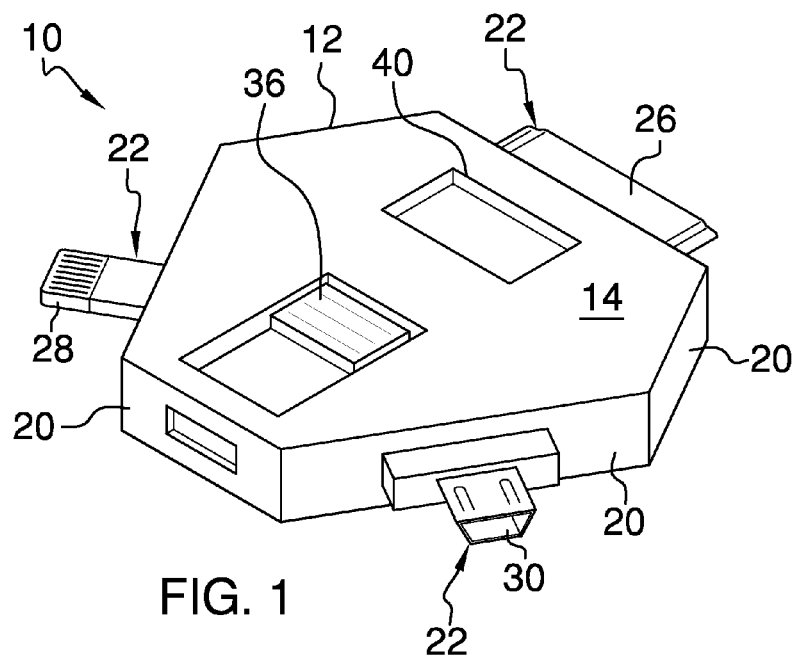
FIG. 1 is a top front side perspective view of a multiple connector direct connection external memory device according to an embodiment of the disclosure.
Figure 2:
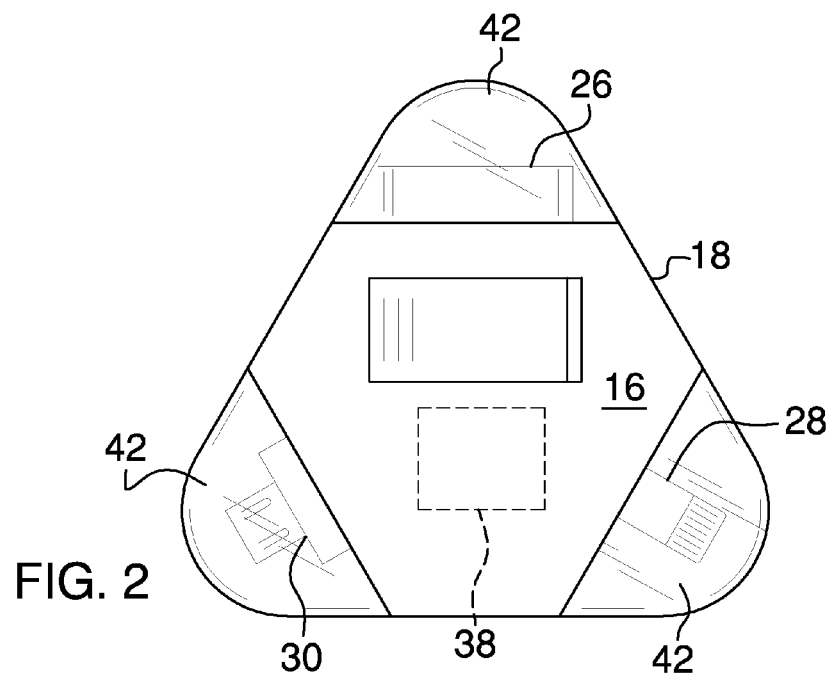
FIG. 2 is a bottom view of an embodiment of the disclosure.
Figure 3:
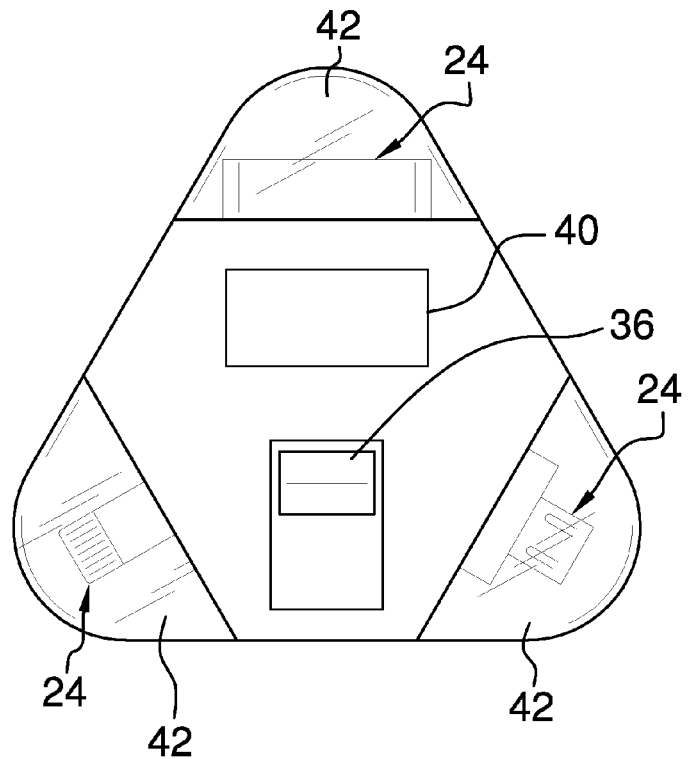
FIG. 3 is a top view of an embodiment of the disclosure.
Figure 4:
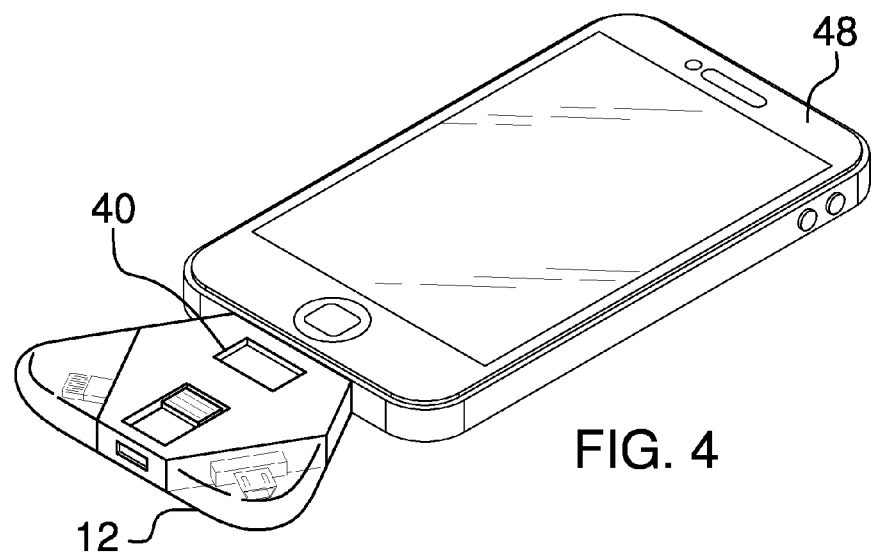
FIG. 4 is a top front side perspective view of an embodiment of the disclosure in use.
Figure 5:
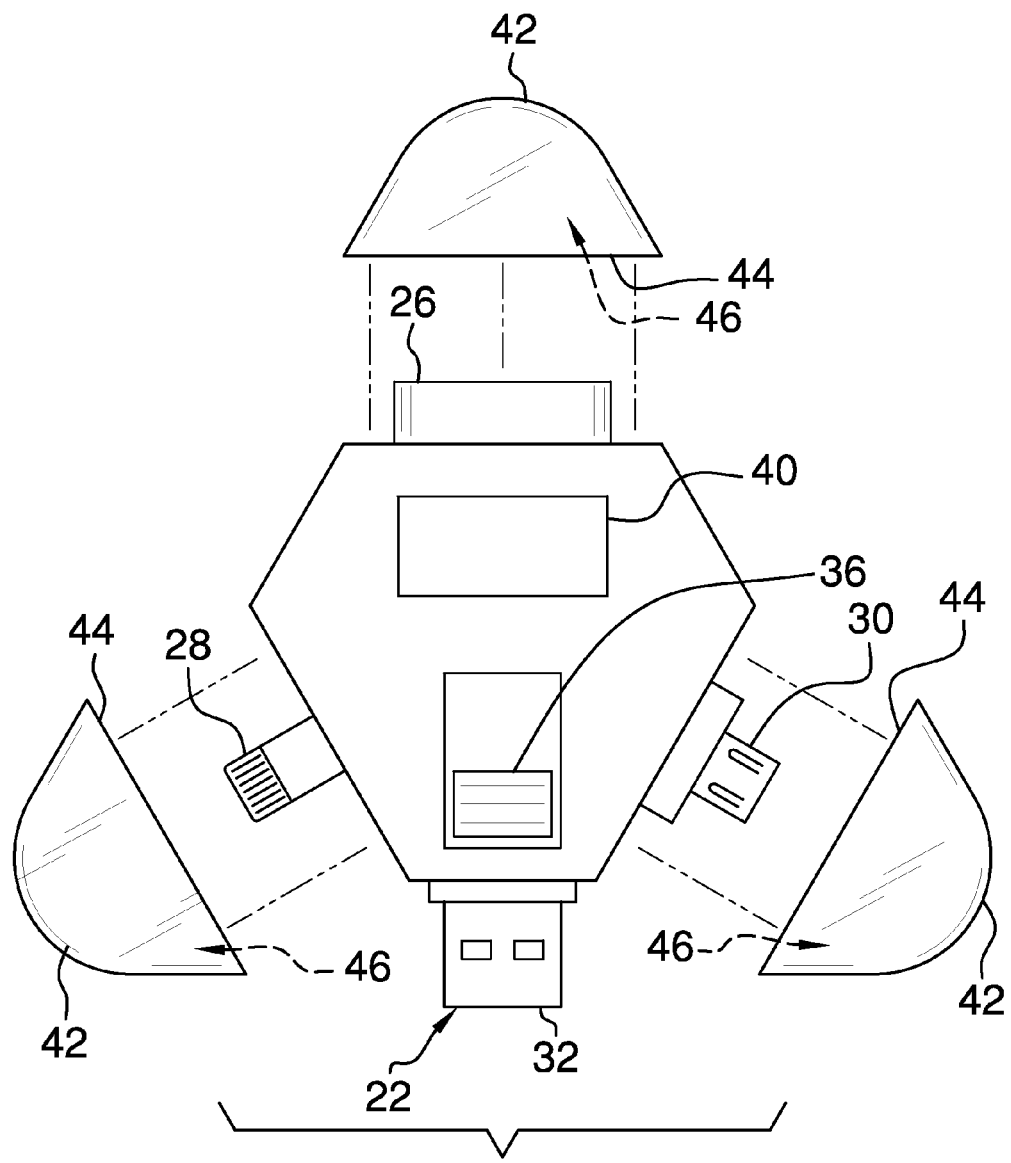
FIG. 5 is a partially exploded top view of an embodiment of the disclosure.

With reference now to the drawings, and in particular to FIGS. 1 through 5 thereof, a new memory device embodying the principles and concepts of an embodiment of the disclosure and generally designated by the reference numeral 10 will be described.

As best illustrated in FIGS. 1 through 5, the multiple connector direct connection external memory device 10 generally comprises a housing 12 having a top face 14, a bottom face 16, and a perimeter edge 18 coupled to and extending between the top face 14 and the bottom face 16. The perimeter edge 18 of the housing 12 comprises a plurality of planar faces 20. In particular, the perimeter edge 18 may comprise six planar faces 20.

A plurality of connectors 22 is provided. Each connector 22 is configured for coupling to a unique port type relative to each other connector 22. Each of the connectors 22 is positioned on an associated one of the planar faces 20. The plurality of connectors 22 comprises a plurality of fixed connectors 24. Each fixed connector 24 is coupled to an associated one of the planar faces 20 of the perimeter edge 18. One of the fixed connectors 24 is a first type of proprietary computer bus 26. One of the fixed connectors 24 is a second type of proprietary computer bus 28. One of the fixed connectors 24 is a micro universal serial bus 30. One of the connectors 22 is a universal serial bus 32. The universal serial bus 32 is slidably coupled to the housing 12 such that the universal serial bus 32 is selectively extendable from an associated one of the planar faces 20 of the perimeter edge 18 of the housing 12. A slider 36 is coupled to the housing 12. The slider 36 is coupled to the universal serial bus 32 wherein manipulation of the slider 36 selectively extends and retracts the universal serial bus 32.

A memory unit 38 is coupled to the housing 12. Each connector 32 is in communication with the memory unit 38. A memory expansion port 40 is coupled to the housing 12. The memory expansion port 40 is communicatively coupled to each of the connectors 22 wherein the memory expansion port 40 is configured for receiving a supplemental extrinsic memory unit, such as a microSD card or the like.

A plurality of caps 42 is provided. Each cap 42 comprises a peripheral edge 44 defining an opening into an interior space 46 of the cap 42. The peripheral edge 44 of each cap 42 is removably coupled to the housing 12 such that the cap 42 covers an associated one of the planar faces 20 of the housing 12 and an associated one of the fixed connectors 24 is positioned in the interior space 46 of the cap 42. Each cap 42 may be either translucent or transparent.

In use, as stated above and shown in the Figures, a selectable one of the connectors 22 is attached to a unique port type on an external electronic device 48. This allows a user to transfer data from the external electronic device 48 to the supplemental extrinsic memory unit and/or the memory unit 38. In this manner, the device 10 allows the user to transfer and retrieve data without requiring a wireless network. The device 10 can be used with external electronic devices 48 that are proprietary, such as Apple products, as well as with standardized devices, such as Android and PC platforms.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A multiple connector direct connection external memory device comprising:
   a housing having a top face, a bottom face, and a perimeter edge coupled to and extending between said top face and said bottom face, said perimeter edge of said housing comprising a plurality of planar faces;
   a plurality of connectors, each connector being configured for coupling to a unique port type relative to each other said connector, each of said connectors being positioned on an associated one of said planar faces;
   at least one of said connectors being a universal serial bus, said universal serial bus being slidably coupled to said housing such that said universal serial bus is selectively extendable from an associated one of said planar faces of said perimeter edge of said housing;
   a slider coupled to said housing, said slider being coupled to said universal serial bus wherein manipulation of said slider selectively extends and retracts said universal serial bus; and
   a memory unit coupled to said housing, each said connector being in communication with said memory unit.

2. The device of claim 1, further comprising said perimeter edge comprising six planar faces.

3. The device of claim 1, further comprising said plurality of connectors comprising a plurality of fixed connectors, each fixed connector being coupled to an associated one of said planar faces of said perimeter edge.

4. The device of claim 3, further comprising a plurality of caps, each said cap comprising a peripheral edge defining an opening into an interior space of said cap, said peripheral edge of each said cap being removably coupled to said housing such that said cap covers an associated one of said planar faces of said housing and an associated one of said fixed connectors is positioned in said interior space of said cap.

5. The device of claim 4, further comprising each said cap being translucent.

6. The device of claim 5, further comprising each said cap being transparent.

7. The device of claim 1, further comprising one of said connectors being a micro universal serial bus.

8. The device of claim 1, further comprising a memory expansion port coupled to said housing, said memory expansion port being communicatively coupled to each of said connectors wherein said memory expansion port is configured for receiving a supplemental extrinsic memory unit.

9. The device of claim 1, further comprising at least one of said connectors being a proprietary computer bus.

10. A multiple connector direct connection external memory device comprising:
    a housing having a top face, a bottom face, and a perimeter edge coupled to and extending between said top face and said bottom face, said perimeter edge of said housing comprising a plurality of planar faces, said perimeter edge comprising six planar faces;
    a plurality of connectors, each connector being configured for coupling to a unique port type relative to each other said connector, each of said connectors being positioned on an associated one of said planar faces, said plurality of connectors comprising a plurality of fixed connectors, each fixed connector being coupled to an associated one of said planar faces of said perimeter edge, one of said fixed connectors being a first type of proprietary computer bus, one of said fixed connectors being a second type of proprietary computer bus, one of said fixed connectors being a micro universal serial bus, one of said connectors being a universal serial bus, said universal serial bus being slidably coupled to said housing such that said universal serial bus is selectively extendable from an associated one of said planar faces of said perimeter edge of said housing;
    a memory unit coupled to said housing, each said connector being in communication with said memory unit;
    a plurality of caps, each said cap comprising a peripheral edge defining an opening into an interior space of said cap, said peripheral edge of each said cap being removably coupled to said housing such that said cap covers an associated one of said planar faces of said housing and an associated one of said fixed connectors is positioned in said interior space of said cap;
    a slider coupled to said housing, said slider being coupled to said universal serial bus wherein manipulation of said slider selectively extends and retracts said universal serial bus; and
    a memory expansion port coupled to said housing, said memory expansion port being communicatively coupled to each of said connectors wherein said memory expansion port is configured for receiving a supplemental extrinsic memory unit.

11. The device of claim 10, further comprising each said cap being translucent.

12. The device of claim 10, further comprising each said cap being transparent.

* * * * *